United States Patent
Nair et al.

(10) Patent No.: US 9,742,600 B2
(45) Date of Patent: Aug. 22, 2017

(54) METHOD AND SYSTEM FOR ESTIMATING AND COMPENSATING FOR DIRECT CURRENT (DC) OFFSET IN ULTRA-LOW POWER (ULP) RECEIVER

(71) Applicant: SAMSUNG ELECTRONICS CO., LTD., Suwon-si (KR)

(72) Inventors: Jinesh P. Nair, Bangalore (IN); Ashutosh Deepak Gore, Bangalore (IN); Kiran Bynam, Bangalore (IN); ChangSoon Park, Chungju-si (KR); Seokju Yun, Hwaseong-si (KR); Young-Jun Hong, Seoul (KR); Manoj Choudhary, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/840,524

(22) Filed: Aug. 31, 2015

(65) Prior Publication Data

US 2016/0234046 A1  Aug. 11, 2016

(30) Foreign Application Priority Data

Feb. 5, 2015  (IN) .............................. 580/CHE/2015
Aug. 11, 2015  (KR) ........................ 10-2015-0113310

(51) Int. Cl.
H04L 25/06 (2006.01)
(52) U.S. Cl.
CPC .................................. H04L 25/061 (2013.01)

(58) Field of Classification Search
CPC ..................................................... H04L 25/061
(Continued)

(56) References Cited

U.S. PATENT DOCUMENTS 7,532,870 B2  5/2009  Ling
8,559,559 B2  10/2013  O'Shea
(Continued)

FOREIGN PATENT DOCUMENTS

JP          4516973 B2       8/2010
KR    10-2003-0088813 A    11/2003
(Continued)

OTHER PUBLICATIONS

Green, Roger A., Richard Anderson-Specher, and John W. Pierre. "Quadrature receiver mismatch calibration." *IEEE transactions on signal processing* 47.11 (1999): pp. 3130-3133.

*Primary Examiner* — Michael Neff
(74) *Attorney, Agent, or Firm* — NSIP Law

(57) ABSTRACT

Provided is a method of estimating a Direct Current (DC) offset in an Ultra-Low Power (ULP) receiver. The method includes receiving a signal from an output of an Analog to Digital Converter (ADC) in the ULP receiver. The signal includes a correlated variable DC component for at least one of an in-phase arm and a quadrature arm of the ULP receiver. The method also includes estimating a DC offset compensation parameter in a plurality of phases for a plurality of stages based on the received signal such that the estimating includes calculating the DC offset compensation parameter in a magnitude estimation phase for the plurality of stages and calculating the DC offset compensation parameter in a sign estimation phase for the plurality of stages.

18 Claims, 18 Drawing Sheets

(58) Field of Classification Search
USPC .......................................................... 375/319
See application file for complete search history.

(56) References Cited

U.S. PATENT DOCUMENTS

| | | | |
|---|---|---|---|
| 8,792,590 B2 | 7/2014 | Furman | |
| 2004/0067741 A1* | 4/2004 | Fei | H04L 27/2657 |
| | | | 455/192.1 |
| 2005/0243217 A1* | 11/2005 | Yun | H03D 3/008 |
| | | | 348/725 |
| 2006/0217069 A1* | 9/2006 | Chen | H04B 1/30 |
| | | | 455/63.1 |
| 2007/0072571 A1 | 3/2007 | Sun et al. | |
| 2009/0068974 A1 | 3/2009 | Smith | |
| 2010/0040174 A1* | 2/2010 | Hui | H04L 25/063 |
| | | | 375/319 |
| 2012/0314602 A1 | 12/2012 | Persson et al. | |
| 2015/0071151 A1* | 3/2015 | Bradley | H04W 52/0235 |
| | | | 370/311 |

FOREIGN PATENT DOCUMENTS

| | | |
|---|---|---|
| KR | 10-0653642 B1 | 11/2006 |
| KR | 10-2009-0078643 A | 7/2009 |
| KR | 10-2010-0062880 A | 6/2010 |
| KR | 10-2014-0076150 A | 6/2014 |
| KR | 10-2014 0105409 A | 9/2014 |

\* cited by examiner

METHOD AND SYSTEM FOR ESTIMATING AND COMPENSATING FOR DIRECT CURRENT (DC) OFFSET IN ULTRA-LOW POWER (ULP) RECEIVER

CROSS-REFERENCE TO RELATED APPLICATION(S)

This application claims the benefit under 35 USC 119(a) of Korean Patent Application No. 10-2015-0113310, filed on Aug. 11, 2015, in the Korean Intellectual Property Office and Indian Patent Application No. 580/CHE/2015, filed on Feb. 5, 2015, in the Office of the Controller General of Patents, Designs & Trade Marks, the entire disclosures of which are incorporated herein by reference for all purposes.

BACKGROUND

1. Field

The following description relates to a Direct Current (DC) offset estimation, and more particularly, to a method and system for estimating and compensating for a DC offset in an Ultra-Low Power (ULP) receiver.

2. Description of Related Art

In general, a wireless receiver may include an analog front end. A Direct Current (DC) offset may be an important factor in an analog receiver including in the analog front end. The DC offset may arise from Local Oscillator (LO) leakage and component mismatching. The DC offset may be generated due to, for example, LO leakage self-mixing, transmission leakage self-mixing, and strong interference self-mixing.

The DC offset may be generated in an analog receiver front end in which the LO signal is mixed with an input Radio Frequency (RF) signal. The DC offset may need to be removed prior to baseband demodulation for a reliable communication. In an Ultra-Low Power (ULP) sliding Intermediate Frequency (IF) non-coherent receiver, the DC offset may cause degradation in a Packet Error Rate (PER) performance.

When gain of a baseband stage is high, a small magnitude of DC offset may also be get magnified due to the high gain and thus, the DC offset may need to be removed. If the DC offset is not removed, degradation in performance may occur in a receiver. Accordingly, there is a desire for a method of compensating for a DC offset in a ULP receiver.

There are provided various DC offset compensation methods. Alternating Current (AC) coupling and high pass filtering may be used as an efficient method of removing a time-invariant DC offset. Alternatively, a time-invariant DC offset in an in-phase arm and a quadrature arm may be calibrated, stored in a memory, and input to a subtraction circuit. A typical method of compensating for the DC offset may be performed through an individual processing for each of an in-phase component and a quadrature component in the receiver, which may use an additional hardware and increase time consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, there is provided a method of estimating a correlated Direct Current (DC) offset in an Ultra-Low Power (ULP) receiver, the method including receiving a signal from an output of an analog to Digital Converter (ADC) in the ULP receiver, the signal which includes a correlated variable DC component for at least one of an in-phase arm and a quadrature arm of the ULP receiver, and estimating a DC offset compensation parameter in a plurality of phases for a plurality of stages based on the received signal, wherein the estimating includes calculating the DC offset compensation parameter in a magnitude estimation phase for the plurality of stages, and calculating the DC offset compensation parameter in a sign estimation phase for the plurality of stages.

The received signal may be an output of an envelope detector of a non-coherent receiver.

The received signal may be an envelope of an in-phase component and a quadrature component of a coherent receiver.

The correlated variable DC component may include a value approximate to a value of a DC offset of the in-phase arm and the quadrature arm.

The plurality of stages may include a noise only stage and a signal and noise stage.

The calculating of the DC offset compensation parameter in the magnitude estimation phase may include calculating, for the signal and noise stage, the DC offset compensation parameter in the magnitude estimation phase using zero values of the received signal in a predetermined time window.

The calculating of the DC offset compensation parameter in the sign estimation phase may include assigning, for at least one of the noise only stage and the signal and noise stage, one of a positive sign and a negative sign to the DC offset compensation parameter in the magnitude estimation phase, obtaining the DC offset compensation parameter in the sign estimation phase in response to compensating for the DC offset performed based on a result of the assigning, analyzing an influence of compensating for the sign estimation phase, and reassigning one of the positive sign and the negative sign to the DC offset compensation parameter based on a result of the analyzing.

The may further include compensating for the DC offset based on a result of the reassigning.

The analyzing may include comparing a value of the DC offset compensation parameter calculated in the magnitude estimation phase to a value of the DC offset compensation parameter calculated in the sign estimation phase.

The reassigning may include maintaining a sign as the result of the assigning when the DC offset compensation parameter calculated in the magnitude estimation phase is greater than the DC offset compensation parameter calculated in the sign estimation phase.

The reassigning may include reversing a sign from the result of the assigning when DC offset compensation parameter calculated in the magnitude estimation phase is smaller than the DC offset compensation parameter calculated in the sign estimation phase.

There is also provided a method of estimating a Direct Current (DC) offset in an Ultra-Low Power (ULP) receiver, the method including receiving a signal from an output of an Analog to Digital Converter (ADC) in the ULP receiver, the signal including a variable DC component for at least one of an in-phase arm and a quadrature arm of the ULP receiver, and estimating a DC offset compensation parameter in a plurality of phases for a plurality of stages based on the received signal, wherein the estimating includes calculating a magnitude of a DC offset in a first phase based on the received signal, calculating a magnitude of the DC offset in a second phase based on the received signal and calculating a DC offset compensation parameter in the in-phase arm based on the magnitudes calculated in the first phase and the second phase, and calculating a magnitude of the DC offset in a third phase based on the received signal and calculating the DC offset compensation parameter in the quadrature arm based on the magnitudes calculated in the first phase and the third phase.

The DC offset compensation parameter in the in-phase arm may include the magnitude and a sign of the DC offset in the in-phase arm, and the DC offset compensation parameter in the quadrature arm may include the magnitude and a sign of the DC offset in the quadrature arm.

The plurality of stages may include a noise only stage and a signal and noise stage.

The method may further include compensating for the DC offset based on the estimated DC offset compensation parameter.

Further there is provided a system for estimating a correlated Direct Current (DC) offset in an Ultra-Low Power (ULP) receiver, the system including a processor, a memory configured to connect to the processor and comprising a plurality of modules operates through the processor, wherein the plurality of modules includes a receiver configured to receive a signal from an output of an Analog to Digital Converter (ADC) in the ULP receiver, the signal including a correlated variable DC component for at least one of an in-phase arm and a quadrature arm in the ULP receiver, an estimator configured to estimate a DC offset compensation parameter for a plurality of stages in a plurality of phases based on the received signal, and wherein the estimator is configured to calculate the DC offset compensation parameter in a magnitude estimation phase for the plurality of stages and calculate the DC offset compensation parameter in a sign estimation phase for the plurality of phases.

The estimator may be configured to estimate the DC offset parameter for at least one of a noise only stage and a signal and noise stage when the DC offset parameter is estimated for the plurality of stages in the plurality of phases by assigning one of a positive sign and a negative sign to the DC offset compensation parameter in the magnitude estimation phase, obtaining the DC offset compensation parameter in the sign estimation phase by compensating for the DC offset based on a result of the assigning, analyzing an influence of compensating for the sign estimation phase, and re-assigning a sign to the DC offset compensation parameter based on a result of the analyzing.

The estimator, in a process of the analyzing, may be configured to compare a value of the DC offset compensation parameter calculated in the magnitude estimation phase to a value of the DC offset compensation parameter calculated in the sign estimation phase.

The estimator, in a process of the re-assigning, may be configured to maintain the result of the assigning in response to the DC offset compensation parameter calculated in the magnitude estimation phase being greater than the DC offset compensation parameter calculated in the sign estimation phase.

The estimator, in a process of the re-assigning, may be configured to reverse the result of the assigning in response to the DC offset compensation parameter calculated in the magnitude estimation phase being smaller than the DC offset compensation parameter calculated in the sign estimation phase.

There is additionally provided a non-transitory computer-readable medium storing program instructions for controlling a processor to perform the method of estimating a correlated DC offset in an ULP receiver.

Still further there is provided a system for estimating a correlated Direct Current (DC) offset in an Ultra-Low Power (ULP) receiver, the system including a processor, a receiver configured to receive a signal from an output of an Analog to Digital Converter (ADC) in the ULP receiver, the signal including a correlated variable DC component for at least one of an in-phase arm and a quadrature arm in the ULP receiver, and an estimator configured to estimate a DC offset compensation parameter for a plurality of stages in a plurality of phases based on the received signal.

The estimator may be configured to calculate the DC offset compensation parameter in a magnitude estimation phase for the plurality of stages and calculate the DC offset compensation parameter in a sign estimation phase for the plurality of phases.

The plurality of stages may include a noise only stage and a signal and noise stage.

The DC offset compensation parameter in the in-phase arm may include the magnitude and a sign of the DC offset in the in-phase arm, and the DC offset compensation parameter in the quadrature arm may include the magnitude and a sign of the DC offset in the quadrature arm.

Other features and aspects will be apparent from the following detailed description, the drawings, and the claims.

Figure 1:
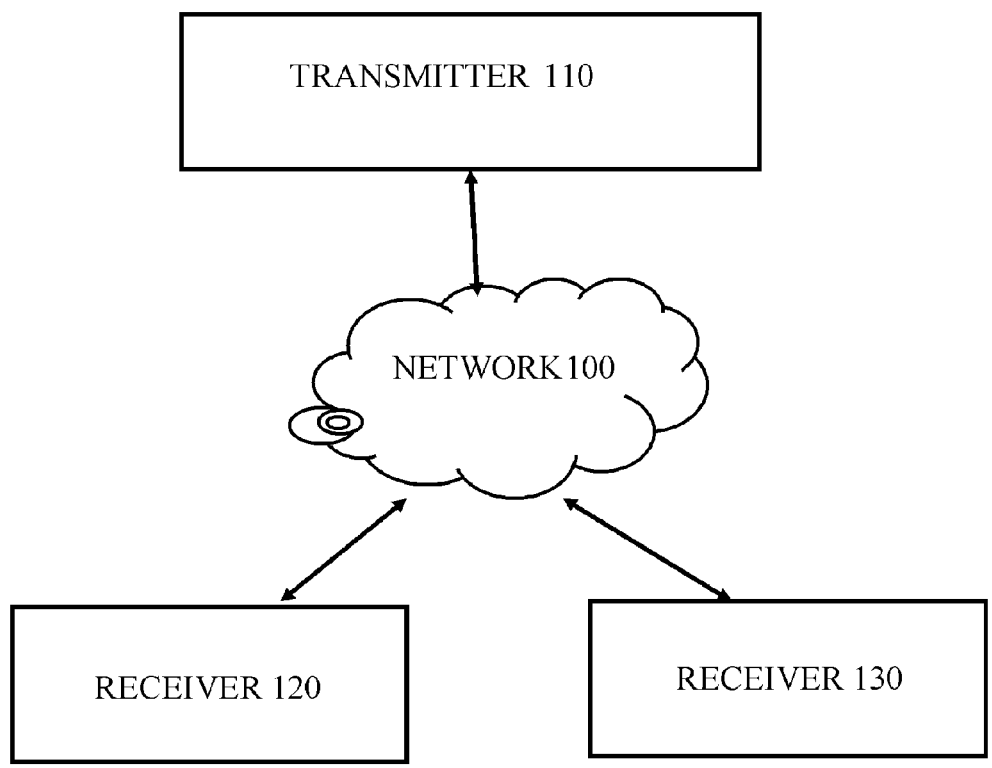
FIG. 1 illustrates an example of a network implementation of a system for estimating a Direct Current (DC) offset in an Ultra-Low Power (ULP) receiver and compensating for the DC offset.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Provided is a method and system for estimating a Direct Current (DC) offset in an Ultra-Low Power (ULP) receiver will be implemented in an example. The ULP receiver may include, for example, a coherent receiver and a non-coherent receiver. Also provided is a method and system for compensating for a DC offset based on the DC offset estimated in the ULP receiver will be implemented in an example. A signal is received from an output of an Analog to Digital Converter (ADC) in the ULP receiver. The received signal includes variable DC components of a plurality of arms in the ULP receiver. The received signal is used to estimate a DC offset parameter for a plurality of stages in a plurality of phases.

FIG. 1 illustrates a relationship among a network 100, a transmitter 110, and receivers 120 and 130. The receivers 120 and 130 may communicate with the transmitter 110 through the network 100. The network 100 may be, for example, a wired network and a wireless network. The receiver 120 and 130 may include a system for estimating DC offset compensation parameters of the receivers 120 and 130, respectively.

Figure 2:
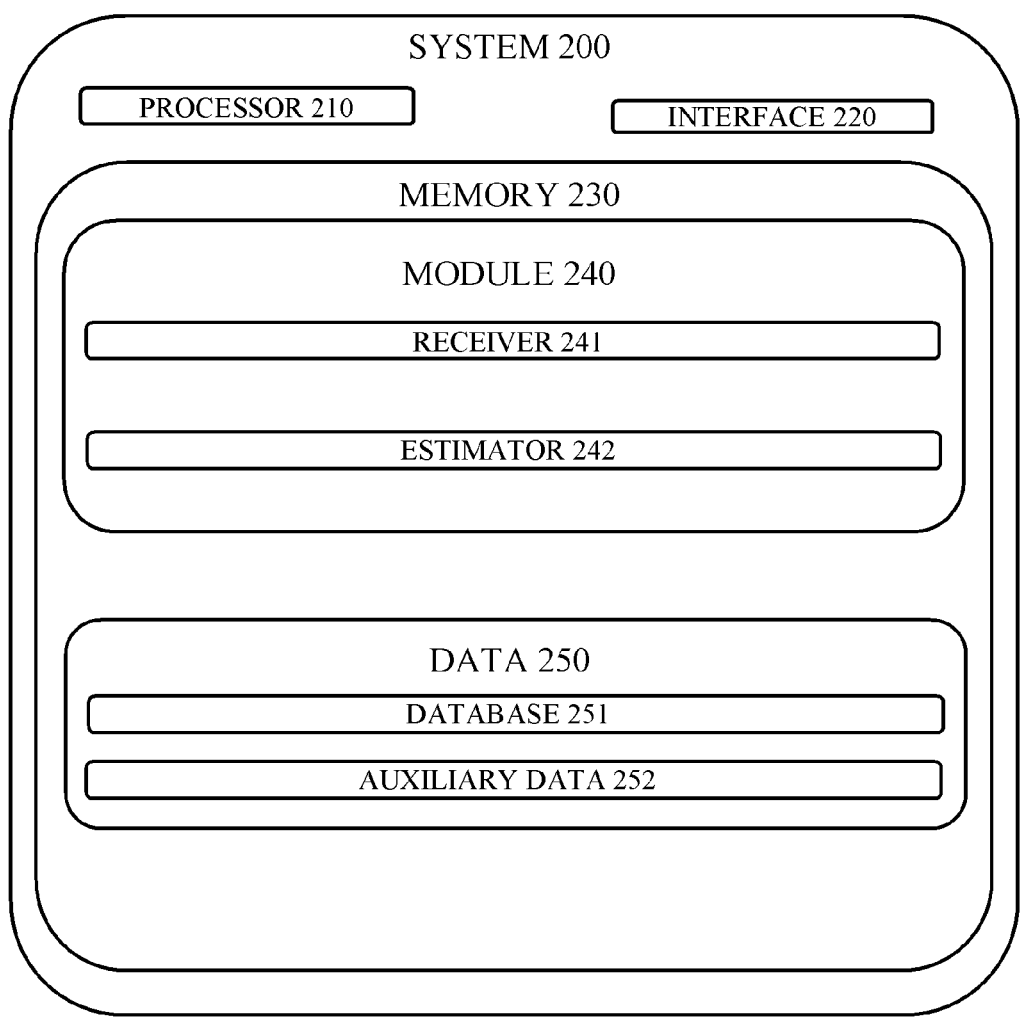
FIG. 2 illustrates an example of a system for estimating a correlated DC offset in a ULP receiver.

FIG. 2 illustrates a system 200 for estimating a correlated DC offset in a ULP receiver. In an example, the system 200 includes at least one processor 210, an Input/Output (I/O) interface 220, and a memory 230.

The at least one processor 210 may be implemented as one or more microprocessors, microcomputers, microcontrollers, digital signal processors, central processing units, state machines, logic circuitries, and/or any devices that manipulate signals based on operational instructions. Among other capabilities, the at least one processor 210 is configured to fetch and execute non-transitory computer-readable instructions stored in the memory 230.

The I/O interface 220 may be used for communications with various networks and protocol types. The various networks may include, for example, a wired network such as a cable, a Local Area Network (LAN), and a wireless network such as a Wireless Local Area Network (WLAN), a cellular phone, and a satellite. The input/output interface 220 may include at least one port to connect to a server or a differing device.

The memory 230 includes at least one module 240. Predetermined tasks and functions may be performed and implemented through the at least one module 240. The at least one module 240 may include, for example, routines, programs, objects, components, and data structures. In an example, the at least one module 240 includes a receiver 241 and an estimator 242. The at least one module 240 may include programs or coded instructions that supplement applications and functions of the system 200.

Data 250 is stored in the memory 230. The data 250 includes, for example, data received from the at least one module 240, data processed by the at least one module 240, and data generated in the at least one module 240. In an example, the data 250 includes a database 251 and auxiliary data 252. The auxiliary data 252 may include data generated as a result of operating the at least one module 240.

Figure 3:
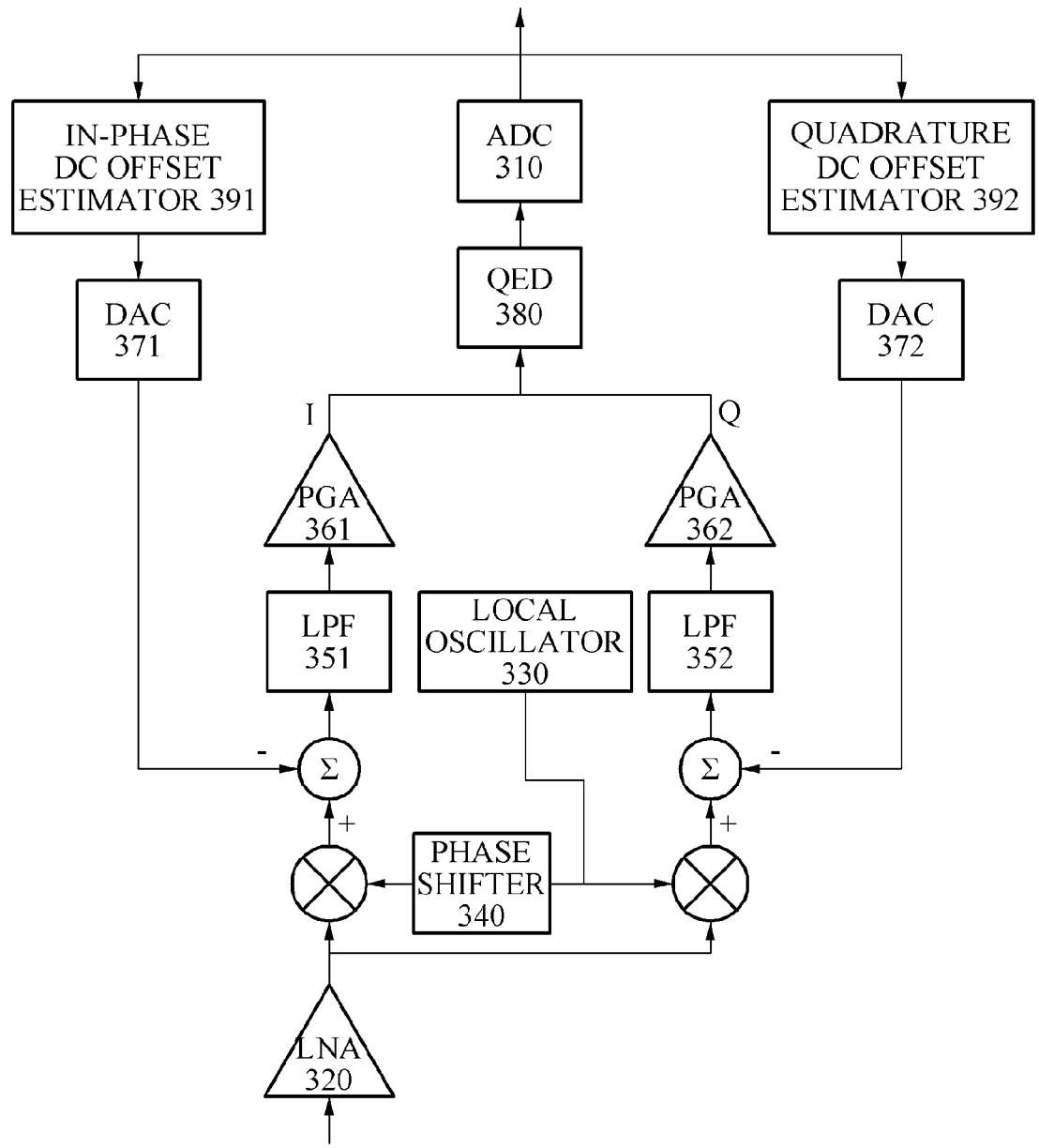
FIG. 3 illustrates an example of architecture for implementing a system for estimating a DC offset in a ULP receiver and compensating for the DC offset.

FIG. 3 illustrates a receiver architecture 300 for estimating a DC offset in a ULP receiver. The receiver architecture 300 includes a ULP receiver which may be a non-coherent energy detection receiver, for example. The DC offset of the ULP receiver may be estimated based on a signal received from an output of an ADC 310. An output of an envelope detector may be used to estimate a DC offset compensation parameter. A system for estimating and compensating for the DC offset may be implemented in a coherent receiver. In an example, an output of an in-phase arm in the coherent receiver and an output of a quadrature arm in the coherent receiver may pass through the envelope detector before the outputs are provided to a DC offset estimation block.

The receiver architecture 300 includes a Low Noise Amplifier (LNA) 320, a local oscillator 330, and a phase shifter 340. The receiver architecture 300 includes Low Pass Filters (LPFs) 351 and 352, and Programmable Gain Amplifiers (PGAs) 361 and 362. The receiver architecture 300 includes Digital to Analog Converters (DACs) 371 and 372, and Quantum Electrodynamics (QED) 380. The receiver architecture 300 includes an in-phase DC offset estimator 391 and a quadrature DC offset estimator 392.

Referring to FIGS. 2 and 3, the receiver 241 of the system 200 is configured to receive a signal from the ADC 310. The received signal may include variable DC components of a plurality of arms in the ULP receiver. The plurality of arms includes an in-phase arm and a quadrature arm. The DC offset may be generated after stages of the PGAs 361 and 362, and before a stage of the QED 380. The DC offset may be dependent on gains of the PGAs 361 and 362.

The estimator 242 of the system 200 estimates a correlated DC offset of a ULP receiver, for example, the ULP receiver of the receiver architecture 300. The correlated DC offset indicates a DC offset of a value approximately equal to a DC offset value for the in-phase arm and the quadrature arm. The DC offset may have a predetermined positive or negative value of a Gaussian distribution based on a PGA gain setting.

Figure 4:
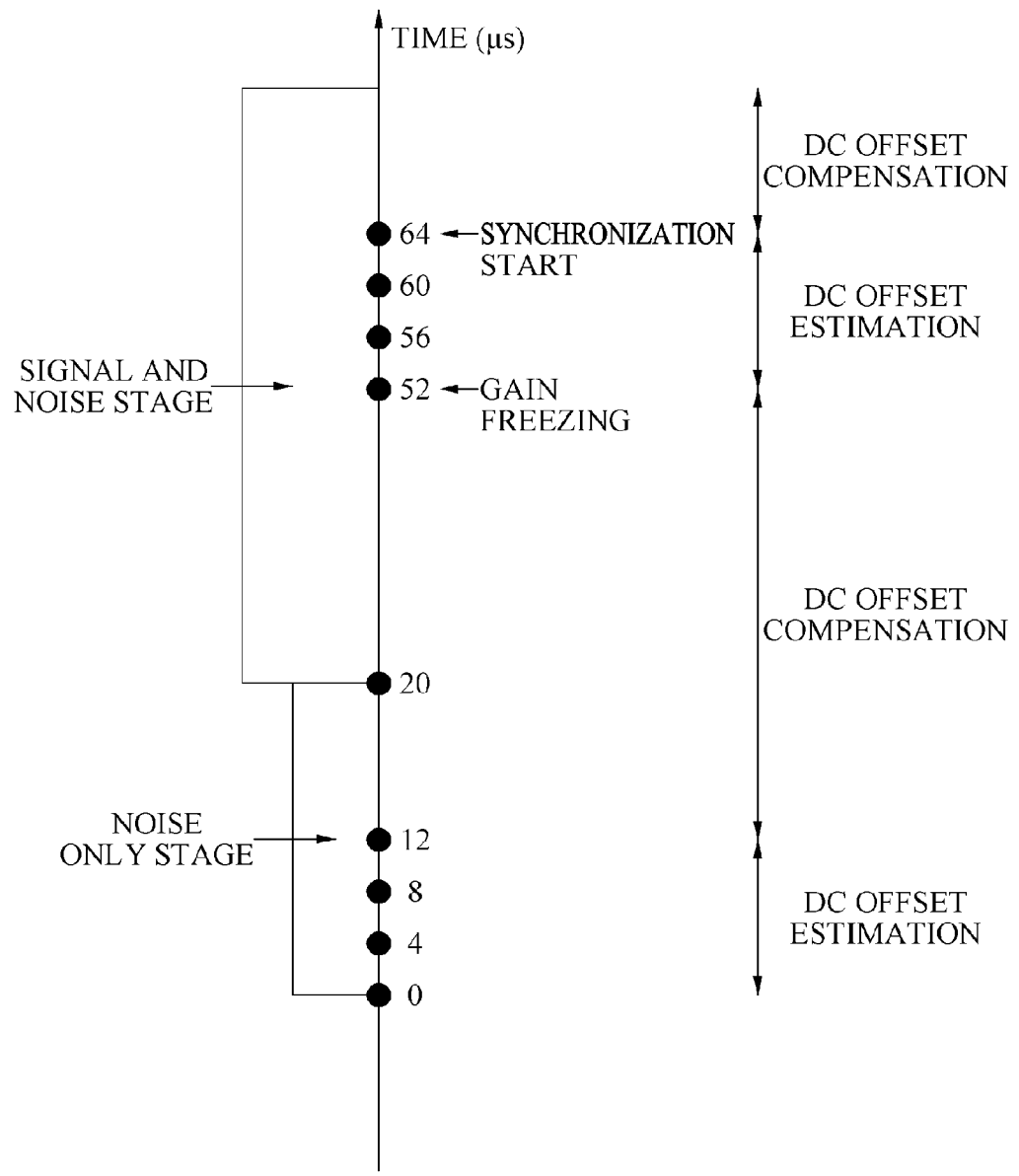
FIG. 4 illustrates an example of a DC offset estimation and compensation process.

FIG. 4 is a timing diagram illustrating an example of DC offset estimation and compensation. The timing diagram of FIG. 4 includes a time sequence in which a DC offset estimation and compensation system interacts with modules of the receiver architecture 300 in a plurality of stages. For example, a DC offset estimation phase is from 0 to 12 microseconds (μs) while a DC offset compensation phase is from 12 to 20 μs. Also, the timing diagram includes a noise only stage and a signal and noise stage.

Figure 5:
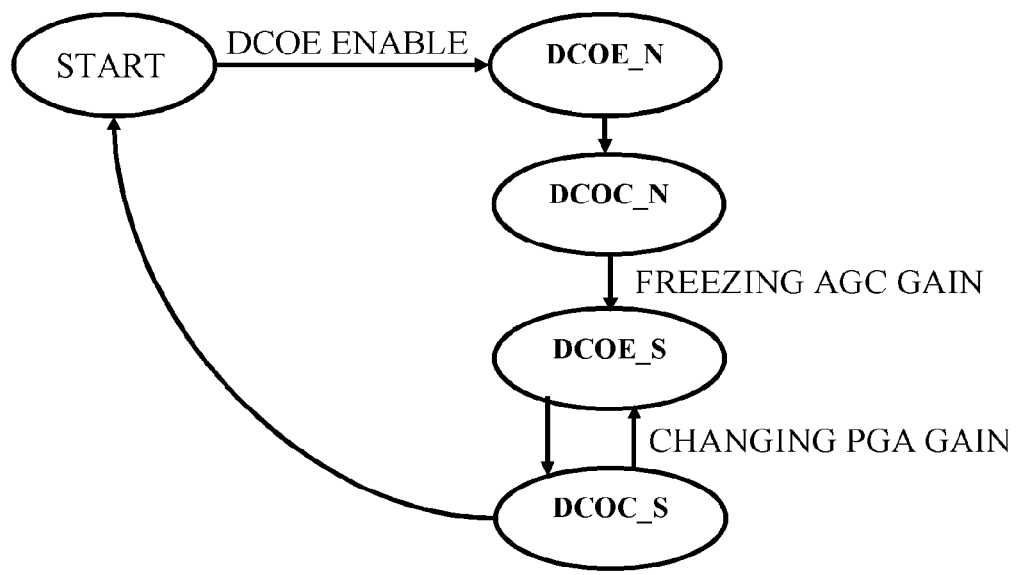
FIG. 5 illustrates another example of a DC offset estimation and compensation process.

FIG. 5 illustrates an example of a DC offset estimation and compensation process. The plurality of stages of the DC offset estimation and compensation process may include a noise only stage provided before a packet is detected and a signal and noise stage provided after the packet is detected. The plurality of phases may also include an offset magnitude estimation phase and an offset sign estimation phase. The DC offset estimation and compensation process may be performed by, for example, the estimator 242 in the system 200 of FIG. 2.

In the noise only state, an Automatic Gain Control (AGC) may freeze a PGA gain. Additionally, a DC offset based on the PGA gain may affect a noise only sample received by the receiver 241. As illustrated in FIG. 5, a DC offset estimation and compensation cycle may start in response to a DC offset estimation enable signal, for example, DCOE Enable, received from a Receiver Finite State Machine (Rx FSM). A DC offset estimation DCOE_N and a DC offset compensation DCOC_N may be performed in the noise only state.

In the signal and noise stage, AGC gain freezing may indicate that another round of DC offset estimation and compensation is to be performed in response to the packet being detected and the AGC being completed. Since a change in the PGA gain causes a change in the DC offset, the DC offset estimation and compensation may be performed again in response to the change in the PGA gain. Thus, in the signal and noise state, the DC offset estimation DCOE_S and the DC offset compensation DCOC_S may be performed again. The DC offset estimation and compensation may be performed every time that the change in the PGA gain is reported by the Rx FSM.

Figure 6:
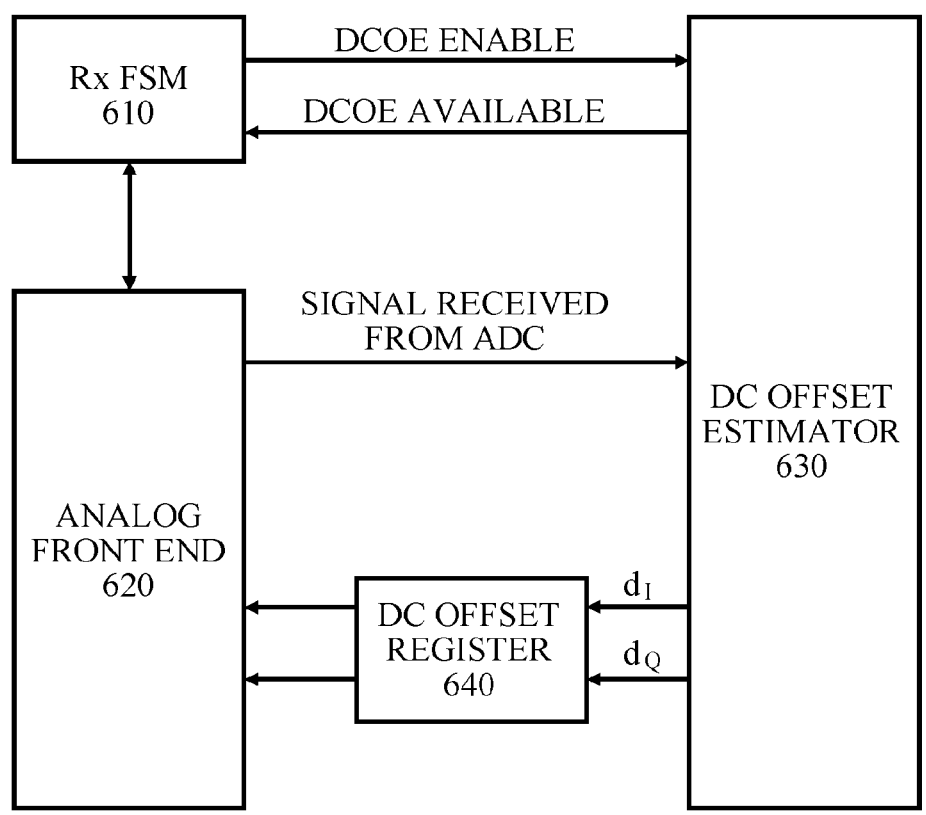
FIG. 6 illustrates an example of receiver architecture for estimating a DC offset.

FIG. 6 illustrates additional components of the receiver architecture 300 for estimating a DC offset. The receiver architecture 300 also includes an Rx FSM 610 to enable a DC offset estimation to be performed, an analog front end 620, a DC offset estimator 630, and a DC offset register 640. In an example, the DC offset estimator 630 may be the estimator 242 of FIG. 2.

Referring to FIG. 6, the Rx FSM 610 transmits a signal DCOE Enable to the DC offset estimator 630 when the DC offset estimation is to be performed. The signal DCOE Enable may be used to activate and inactivate the DC offset estimator 630 performing the DC offset estimation. The DC offset estimator 630 estimates a DC offset by receiving a digitized QED signal from the ADC 310.

The DC offset estimator 630 estimates a final DC offset value by recursively applying a DC offset intermediate value to the DC offset estimation in consecutive phases. In the consecutive phases, the DC offset intermediate value may be stored in the DC offset register 640 and may be transmitted to the Rx FSM 610 based on a DC offset estimation available signal, for example, a signal DCOE Available. Also, the final DC offset value may be stored in the DC offset register 640 and may be transmitted to the Rx FSM 610 based on the signal DCOE Available. The Rx FSM 610 transmits a command signal to the analog front end 620 to perform a DC offset compensation and baseband process.

When Additive White Gaussian Noise (AWGN) is present, a signal y(n) received from an output of the ADC 310 may be expressed as shown in Equation 1.

$$y(n) = \sqrt{[x_i(n)+d_i+w_i(n)]^2+[x_q(n)+d_q+w_q(n)]^2}$$ [Equation 1]

In Equation 1, $x_i(n)$ and $x_q(n)$ denote data portions at a time n. $w_i(n)$ and $w_q(n)$ denote noise portions at the time n. Also, $d_i$ and $d_q$ denote DC offsets in the in-phase arm and the quadrature arm, respectively.

When a variable DC offset component input from the DC offset register 640 in FIG. 6 is applied to Equation 1, the variable DC offset component is expressed as shown in Equation 2.

$$y(n) = \sqrt{[x_i(n)+d_i+d_i^t+w_i(n)]^2+[x_q(n)+d_q+d_q^t+w_q(n)]^2}$$ [Equation 2]

In Equation 2, $d_i^t$ and $d_q^t$ are functions related to the PGA gain changing in each packet based on an initial PGA gain setting at a start of a corresponding packet.

When a data signal is absent, for example, in the noise only stage, $x_i(n)=x_q(n)=0$. In this example, the signal y(n) is expressed as shown in Equation 3.

$$y(n) = \sqrt{[d_i+w_i(n)]^2+[d_q+w_q(n)]^2}$$ [Equation 3]

Thus, in the noise only stage, $d_i$ and $d_q$ are estimated in a state in which only the AWGN exists.

In terms of the signal and noise stage, $x_i(n), x_q(n) \neq 0$. Thus, a data portion received by, for example, the receiver 241 may also be used. In an example, a signal having zero amplitudes, for example, an off-chip signal, may be transmitted in a portion corresponding to $x_i(n), x_q(n) \approx 0$. The signal may be based on a case in which a data signal does not have a magnitude in the signal and noise stage and thus, may be used for the DC offset estimation. To estimate the DC offset parameter in the signal and noise stage, a preamble for a non-coherent receiver may be designed to use a sufficient number of zero values in a general receiving process duration of the signal and noise stage.

Hereinafter, a calculation performed to estimate a DC offset when an in-phase DC offset has a strong correlation with a quadrature DC offset will be provided with reference to the following descriptions.

When the in-phase DC offset has a strong correlation with the quadrature DC offset, the DC offset may be assumed to be, for example, $d_i=d_q=d$, and the in-phase/quadrature (I/O)

coefficient may be assumed to be 1. In this example, a signal y(n) may be expressed as shown in Equation 4.

$$y(n)=\sqrt{[x_i(n)+d+w_i(n)]^2+[x_q(n)+d+w_q(n)]^2}$$ [Equation 4]

In terms of the noise only stage, $x_i(n)=x_q(n)=0$. In this example, the signal y(n) may be expressed as shown in Equation 5.

$$y(n)=\sqrt{[d+w_i(n)]^2+[d+w_q(n)]^2}$$ [Equation 5]

In an example, the estimator 242 estimates the DC offset for the plurality of stages in the plurality of phases. The plurality of stages includes a noise only stage and a signal and noise stage. The plurality of phases includes an offset magnitude estimation phase and an offset sign estimation phase.

The estimator 242 is configured to estimate the DC offset for the noise only stage in the plurality of phases.

In the offset magnitude estimation phase, a magnitude of the DC offset may be estimated. The estimator 242 may obtain an average of signals received by the receiver 241 during a predetermined time window. FIG. 4 illustrates an example of the time window. As an example, a length of the time window may be defined as N, and a DC offset magnitude $|\hat{d}_0|$ corresponding to a time window $n_1 \leq n < n_1+N$ may be expressed as shown in Equation 6.

$$|\hat{d}_0| = \frac{1}{\sqrt{2}} \times \frac{1}{g_{QED}} \times \sqrt{\frac{1}{N}\sum_{n=0}^{N-1} y^2(n)} =$$ [Equation 6]

$$\frac{1}{\sqrt{2}} \times \frac{1}{g_{QED}} \times \sqrt{\frac{1}{N}\sum_{n=0}^{N-1} [d+w_i(n)]^2 + [d+w_q(n)]^2} \therefore$$

$$|\hat{d}_0| = \frac{1}{\sqrt{2}} \times \frac{1}{g_{QED}} \times$$

$$\sqrt{2d^2 + \frac{1}{N}\sum_{n=0}^{N-1} w_i^2(n) + \frac{1}{N}\sum_{n=0}^{N-1} w_q^2(n) + \left\{\frac{2d}{N}\sum_{n=0}^{N-1} 2w_i(n) + w_q(n)] \approx 0\right\}}$$

Based on Equation 6, the estimator 242 estimates only an offset magnitude among DC offset parameters. The estimator 242 transmits the estimated offset magnitude to the DC offset register 640 to estimate an offset sign.

In the offset sign estimation phase, the estimator 242 assigns one of a positive sign and a negative sign to the offset magnitude estimated in the offset magnitude estimation phase for at least one of the noise only stage and the signal and noise stage. When one of the positive sign and the negative sign is assigned, the estimator 242 estimates the DC offset based on a sign assigned to the offset magnitude. The estimator 242 may analyze an influence of the assigned sign exerted to the DC offset magnitude in the offset sign estimation phase. The estimator 242 may retain or re-assign the assigned sign based on a result of the analyzing.

Descriptions related to a process of estimating the sign of the DC offset will also be provided as follows. The magnitude, for example, $|\hat{d}_0|$, of the DC offset estimated in the offset magnitude estimation phase may be applied to an analog baseband through a subtraction. In the offset sign estimation phase, the estimator 242 performs the offset magnitude estimation again for a subsequent time window. For example, an average signal received by the receiver 241 for a subsequent time window $n_1+N \leq n < n_1+2N$ may be obtained. A DC offset magnitude $|\hat{d}_1|$ for the time window $n_1+N \leq n < n_1+2N$ is expressed as shown in Equation 7.

$$|\hat{d}_1| = \frac{1}{\sqrt{2}} \times \frac{1}{g_{QED}} \times \sqrt{\frac{1}{N}\sum_{n=0}^{N-1} y^2(n)}$$ [Equation 7]

$$|\hat{d}_1| = \frac{1}{\sqrt{2}} \times \frac{1}{g_{QED}} \times$$

$$\sqrt{\frac{1}{N}\sum_{n=0}^{N-1} [d-|\hat{d}_0|+w_i(n)]^2 + [d-|\hat{d}_0|+w_q(n)]^2}$$

The estimator 242 analyzes an influence of the assigned signal by comparing $|\hat{d}_0|$ to $|\hat{d}_1|$. When an increase in the offset magnitude is identified by the estimator 242, for example, when a result of the comparing indicates $|\hat{d}_0|<|\hat{d}_1|$, an opposite sign of the assigned sign is to be applied. Thus, the sign assigned to the DC offset may need to be reversed.

Conversely, when a significant decrease in the offset magnitude is identified by the estimator 242, for example, when the result of the comparing indicates $|\hat{d}_0|>|\hat{d}_1|$, the assigned sign is the same as a sign to be applied. Thus, the sign assigned to the DC offset may remain as the same.

The estimator 242 is configured to estimate the DC offset in the plurality of phases, in the signal and noise stage.

When the packet is detected and the AGC gain is frozen, the estimator 242 measures the DC offset. For example, a DC offset measurement may be initiated in response to the signal DCOE Enable received from the Rx FSM 610. The signal received by the receiver 241 may be expressed as shown in Equation 8.

$$y(n)=\sqrt{[x_i(n)+d+w_i(n)]^2+[x_q(n)+d+w_q(n)]^2}$$ [Equation 8]

Based on Amplitude-Shift Keying (ASK) and On-Off Keying (OOK) modulation schemes, the received signal may include a DC offset corrupted by noise only when an amplitude of the signal is 0, for example, $x_i(n)=x_q(n)=0$. Thus, in this example, the received signal may not include a data signal. As an example, a signal $y^+(n)$ may be obtained by receiving the signal y(n) when $x_i(n) \approx x_q(n) \approx 0$. In this example, the estimator 242 may estimate the DC offset based on the signal $y^+(n)$ using a similarly to the noise only stage. Descriptions related to the DC offset estimation process will also be provided as follows.

In operation 1, the estimator 242 estimates $N^+$ samples of the signal $y^+(n)$ based on N samples of the signal y(n) received in the time window $n_2 \leq n < n_2+N$. Here, $n_2$ denotes a time at which the signal DCOE Enable is received from the Rx FSM 610 after the AGC gain is frozen.

In operation 2, the estimator 242 estimates a DC offset magnitude based on the signal $y^+(n)$. The DC offset magnitude $|\hat{d}_0|^+$ is expressed as shown in Equation 9.

$$|\hat{d}_0|^+ = \frac{1}{\sqrt{2}} \times \frac{1}{g_{QED}} \times \sqrt{\frac{1}{N^+}\sum_{n=0}^{N^+-1} y^{+2}(n)}$$ [Equation 9]

In operation 3, the estimator 242 applies the DC offset magnitude $|\hat{d}_0|^+$ to the in-phase arm and the quadrature arm in the analog front end through a subtraction. The DC offset magnitude $|\hat{d}_0|^+$ may be applied to the time window $n_2+N \leq n < n_2+2N$.

In operation 4, the estimator 242 estimates the DC offset magnitude $|\hat{d}_1|^+$ in the time window $n_2+N \leq n < n_2+2N$.

In operation 5, in response to an increase in the DC offset magnitude, for example $|\hat{d}_0|^+ < |\hat{d}_1|^+$, the sign assigned to the DC offset applied to the time window $n_2+N<n<n_2+2N$ is identified to be incorrect. Thus, after a time $n>n_2+2N$, a reversed sign may be re-assigned to apply the DC offset. Alternatively, the assigned sign is identified to be correct and thus, the DC offset sign remains the same. Through this, the DC offset sign may be maintained or re-assigned based on a result of the comparing $|\hat{d}_0|^+$ to $|\hat{d}_1|^+$.

In an example, the system 200 is configured to compensate for the DC offset in the receiver architecture 300. When the DC offset is estimated, the DC offset compensation process may be initiated, and then a DC offset estimation may be transferred to the DC offset register 640 based on a Serial Peripheral Interface (SPI) protocol. Subsequently, the DC offset estimation may be applied to the analog baseband to compensate for the DC offset in the receiver architecture 300 through a subtraction.

Figure 7:
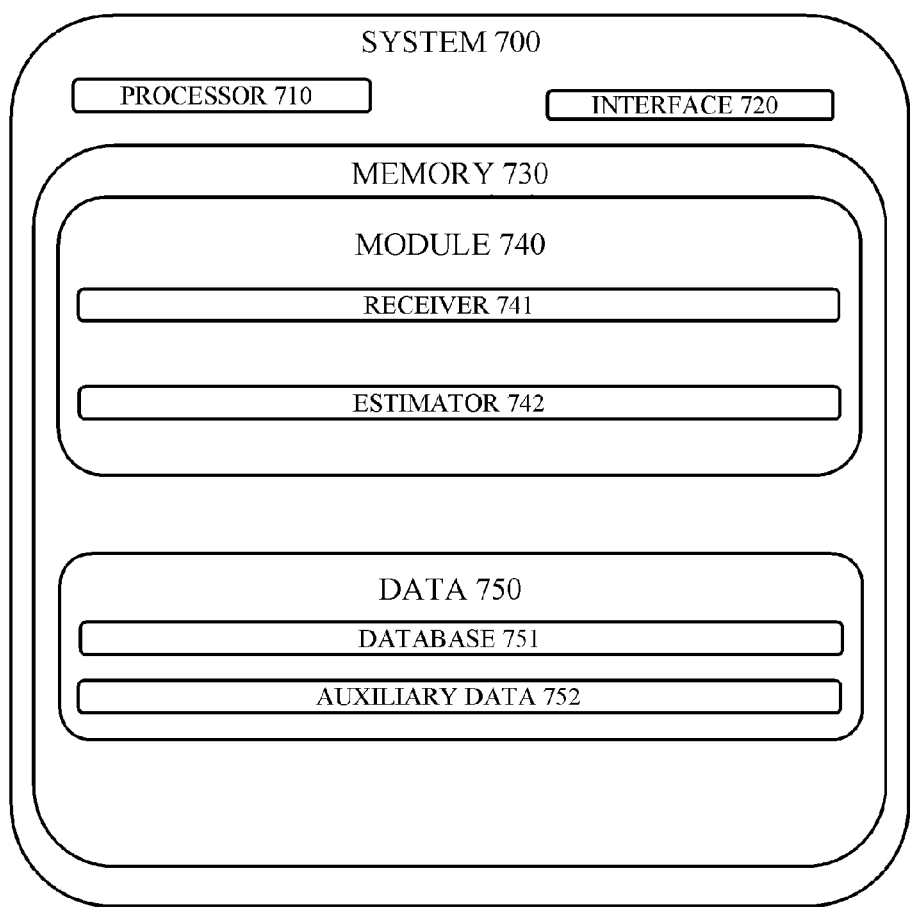
FIG. 7 illustrates an example of a system for estimating a DC offset in a ULP receiver.

FIG. 7 illustrates a system 700 for estimating a DC offset in a ULP receiver. The system 700 is configured to compensate for a DC offset in the receiver architecture 300 of FIG. 3. Similarly to the system 200 of FIG. 2, the system 700 includes a processor 710, an interface 720, and a memory 730. The memory 730 includes at least one module 740. In an example, at least one module 740 includes a receiver 741 and an estimator 742.

Data 750 is stored in the memory 730. The data 750 includes, for example, data received by the at least one module 740 data processed by the at least one module 740, and data generated by the least one module. In an example, the data 740 includes a database 751 and auxiliary data 752. The auxiliary data 752 includes data generated as a result of executing the at least one module 740.

The estimator 742 may estimate the DC offset for a plurality of stages in a plurality of phases. The plurality of stages includes a noise only stage and a signal and noise stage. The plurality of phases includes a first phase, a second phase, and a third phase. Related descriptions will also be provided as follows.

The estimator 742 is configured to estimate the DC offset in the plurality of phases, in the noise only stage. A signal y(n) received by the receiver 741 is expressed as shown in Equation 10.

$$y(n) = \sqrt{[d_i+w_i(n)]^2+[d_q+w_q(n)]^2} \qquad \text{[Equation 10]}$$

In the first phase, the estimator 742 calculates a magnitude of the DC offset based on the signal received by the receiver 741.

In the second phase, the estimator 742 calculates the magnitude of the DC offset based on the received signal, and estimates a sign and a magnitude of the DC offset in an in-phase arm based on the a DC offset magnitude calculated in the first phase and the second phase.

In the third phase, the estimator 742 calculates the magnitude of the DC offset based on the received signal, and estimates a sign and a magnitude of the DC offset in a quadrature arm based on a DC offset magnitude calculated in the first phase and the third phase.

Descriptions related to an operation of the system 700 will be provided as an example with reference to FIG. 6. The Rx FSM 610 enables the DC offset estimator 630 to operate at a time $n_1$. The DC offset estimator 630 collects N samples from the received signal. The N samples may be, for example, a minimum number of samples selected for ensuring an estimation accuracy.

In the first phase, the estimator 742 estimates a DC offset magnitude for a time window $n_1<n<n_1+N$. The estimated DC offset magnitude is expressed as shown in Equation 11.

$$|\hat{d}_{mag}| = \frac{1}{g_{QED}} \times \sqrt{\frac{1}{N}\sum_{n=0}^{N-1} y^2(n)} \qquad \text{[Equation 11]}$$

Also, Equation 11 is approximated as shown in Equation 12.

$$|\hat{d}_{mag}| \approx \frac{1}{g_{QED}} \times \sqrt{d_I^2 + d_q^2 + \frac{1}{N}\sum_{n=0}^{N-1} w_i^2(n) + \frac{1}{N}\sum_{n=0}^{N-1} w_q^2(n)} \approx \frac{1}{g_{QED}}\sqrt{d_I^2 + d_q^2} \qquad \text{[Equation 12]}$$

In the second phase, the estimator 742 estimates an in-phase component of the DC offset. A DC offset compensation for a quadrature component may be input as a value of 0 in the second phase, and the DC offset magnitude estimated in the first phase may be subtracted from the in-phase arm. A complex number of the variable DC offset applied to the analog front end is expressed as, for example, $-|\hat{d}_{mag}|+j0$. Thus, a signal received by the receiver 741 for a subsequent time window $n_1+N<n<n_1+2N$ is expressed as shown in Equation 13.

$$y(n)=\sqrt{[d_I-|\hat{d}_{mag}|+w_i(n)]^2+[d_Q+w_q(n)]^2} \qquad \text{[Equation 13]}$$

Equation 13 is also expressed as shown in Equation 14.

$$y(n) = \sqrt{\left(d_I + w_I(n) - \sqrt{d_I^2 + d_Q^2}\right)^2 + (d_Q + w_Q(n))^2} = \sqrt{\begin{array}{c} 2(d_I^2 + d_Q^2) + w_I^2 + w_Q^2 + 2d_Iw_I + 2d_Qw_Q - \\ 2w_I\left(\sqrt{d_I^2 + d_Q^2}\right) - 2d_I\left(\sqrt{d_I^2 + d_Q^2}\right) \end{array}} \qquad \text{[Equation 14]}$$

An average influence of a noise portion is expressed as shown in Equation 15.

$$|X_{avg}|^2 = \frac{1}{N*g_{QED}}\sum_{n=0}^{N-1} y^2(n) = 2(d_I^2 + d_Q^2) + \sigma_I^2 + \sigma_Q^2 - 2d_I\left(\sqrt{d_I^2 + d_Q^2}\right) \qquad \text{[Equation 15]}$$

Thus, the in-phase component of the DC offset estimated by the estimator 742 is expressed as shown in Equation 16.

$$\hat{d}_I = \frac{2|\hat{d}_{mag}|^2 - |X_{avg}|^2}{2|\hat{d}_{mag}|} \qquad \text{[Equation 16]}$$

In the third phase, the estimator 742 estimates the quadrature component of the DC offset by applying a variable DC offset $0-j|\hat{d}_{mag}|$ to an analog front end in a time window $n_1+2N<n<n_1+3N$. The signal y(n) received in the third phase is expressed as shown in Equation 17.

$$y(n)=\sqrt{[d_I+w_I(n)]^2+[d_Q-|\hat{d}_{mag}|+w_Q(n)]^2} \qquad \text{[Equation 17]}$$

Equation 17 is also expressed as shown in Equation 18.

$$y(n) = \sqrt{(d_I + w_I(n))^2 + \left(d_Q - \sqrt{d_I^2 + d_Q^2} + w_Q(n)\right)^2} = \sqrt{\begin{array}{c} 2(d_I^2 + d_Q^2) + w_I^2 + w_Q^2 + 2d_I w_I + 2d_Q w_Q - \\ 2w_Q\left(\sqrt{d_I^2 + d_Q^2}\right) - 2d_Q\left(\sqrt{d_I^2 + d_Q^2}\right) \end{array}}$$ [Equation 18]

An average influence of the noise portion is expressed as shown in Equation 19.

$$|Y_{avg}|^2 = \frac{1}{N * g_{QED}} \sum_{n=0}^{N-1} y^2(n) = 2(d_I^2 + d_Q^2) + \sigma_I^2 + \sigma_Q^2 - 2d_Q\left(\sqrt{d_I^2 + d_Q^2}\right)$$ [Equation 19]

Thus, the quadrature component of the DC offset estimated by the estimator 742 is expressed as shown in Equation 20.

$$\hat{d}_Q = \frac{2|\hat{d}_{mag}|^2 - |Y_{avg}|^2}{2|\hat{d}_{mag}|}$$ [Equation 20]

The estimator 742 obtains a DC offset $\hat{d}_I + j\hat{d}_Q$ based on the in-phase component and the quadrature component of the DC offset as shown in Equations 16 and 20.

Alternatively, in the second phase, a variable DC offset expressed in Equation 21 may be applied to the analog front end.

$$|\hat{d}_{mag}|^S = \frac{1}{g_{QED}} \times \frac{1}{N} \sum_{n=0}^{N-1} y^2(n)$$ [Equation 21]

In this example, an in-phase component and a quadrature component of the DC offset estimated in the second phase and the third phase are expressed as shown in Equations 22 and 23, respectively.

$$\hat{d}_I = \frac{\left(|\hat{d}_{mag}|^S\right)^2 + |\hat{d}_{mag}|^S - |X_{avg}|^2}{2|\hat{d}_{mag}|^S}$$ [Equation 22]

$$\hat{d}_Q = \frac{\left(|\hat{d}_{mag}|^S\right)^2 + |\hat{d}_{mag}|^S - |Y_{avg}|^2}{2|\hat{d}_{mag}|^S}$$ [Equation 23]

The estimator 742 is also configured to estimate the DC offset in the plurality of phases, in the signal and noise stage. The estimator 742 estimates the DC offset when an AGC gain is frozen after a packet is detected. For example, a DC offset measurement is initiated in response to a signal DCOE Enable received from the Rx FSM 610. The signal received by the receiver 741 is expressed as shown in Equation 24.

$$y(n) = \sqrt{[x_I(n) + d_I + w_i(n)]^2 + [x_Q(n) + d_Q + w_q(n)]^2}$$ [Equation 24]

In ASK and OOK modulations, the received signal may include a DC offset caused by noise only when an amplitude of the signal is 0, for example, $x_i(n) = x_q(n) = 0$. In this example, the received signal may not include a data signal. As an example, a signal $y^+(n)$ may be obtained by receiving the signal $y(n)$ when $x_i(n) \approx x_q(n) \approx 0$. In this example, the estimator 742 estimates a DC offset based on the signal $y^+(n)$ using a similar method when compared to the noise only stage. Descriptions related to the DC offset estimation process of the estimator 742 will also be provided with reference to FIG. 8.

In operation 1, the estimator 742 estimates $N^+$ samples of the signal $y^+(n)$ based on N samples of the signal $y(n)$ received in the time window $n_2 < n < n_2 + N$. Here, $n_2$ denotes a time at which the signal DCOE Enable is received from the Rx FSM 610 after the AGC gain is frozen.

In operation 2, the estimator 742 estimates a DC offset magnitude $|\hat{d}_{mag}|^+$ for a time window $n_2 < n < n_2 + N$ based on the signal $y^+(n)$. The DC offset magnitude $|\hat{d}_{mag}|^+$ is expressed as shown in Equation 25.

$$|\hat{d}_{mag}|^+ = \frac{1}{g_{QED}} \times \sqrt{\frac{1}{N^+} \sum_{n=0}^{N^+ - 1} y^{+2}(n)}$$ [Equation 25]

In operation 3, the estimator 742 estimates an in-phase component $\hat{d}_I^+$ of the DC offset. To estimate the in-phase component $\hat{d}_I^+$ of the DC offset, a DC offset $-|\hat{d}_{mag}|^+ + j0$ may be applied to the in-phase arm through a subtraction in a time window $n_2 + N < n < n_2 + 2N$. $\hat{d}_I^+$ estimated by the estimator 742 is expressed as shown in Equation 26.

$$\hat{d}_I^+ = \frac{2|\hat{d}_{mag}|^{+2} - |X_{avg}|^{+2}}{2|\hat{d}_{mag}|^+}$$ [Equation 26]

In operation 4, the estimator 742 estimates a quadrature component $\hat{d}_Q^+$ of the DC offset. To estimate the quadrature component $\hat{d}_Q^+$ of the DC offset, a DC offset $0 - j|\hat{d}_{mag}|^+$ may be applied to the quadrature arm through a subtraction in a time window $n_2 + 2N < n < n_2 + 3N$. $\hat{d}_Q^+$ estimated by the estimator 742 is expressed as shown in Equation 27.

$$\hat{d}_Q^+ = \frac{2|\hat{d}_{mag}|^{+2} - |Y_{avg}|^{+2}}{2|\hat{d}_{mag}|^+}$$ [Equation 27]

In operation 5, the estimator 742 applies a DC offset $\hat{d}_I^+ + j\hat{d}_Q^+$ through a subtraction to compensate for the DC offset for a time window $n > n_2 + 3N$ before another input is received from the Rx FSM 610.

Alternatively, in the second phase, a variable DC offset expressed in Equation 28 may be applied to the analog front end.

$$|\hat{d}_{mag}|_S^+ = \frac{1}{g_{QED}} \times \frac{1}{N^+} \sum_{n=0}^{N^+ - 1} y^{+2}(n)$$ [Equation 28]

In this example, an in-phase component and a quadrature component of the DC offset estimated in the second phase and the third phase are expressed as shown in Equations 29 and 30, respectively.

$$\hat{d}_I^+ = \frac{\left(|\hat{d}_{mag}|_S^+\right)^2 + |\hat{d}_{mag}|_S^+ - |X_{avg}|^{+2}}{2|\hat{d}_{mag}|_S^+} \quad \text{[Equation 29]}$$

$$\hat{d}_Q^+ = \frac{\left(|\hat{d}_{mag}|_S^+\right)^2 + |\hat{d}_{mag}|_S^+ - |Y_{avg}|^{+2}}{2|\hat{d}_{mag}|_S^+} \quad \text{[Equation 30]}$$

In the noise only stage, the DC offset register 640 is initialized to be a value, for example, 0. The DC offset estimator 630 may use all samples in the plurality of phases for an estimation process in the noise only stage. Also, the DC offset estimator 630 may use zero values of a preamble for the estimation process in the signal and noise stage.

In an example, the system 700 is configured to compensate for the DC offset in the receiver architecture 300. When the DC offset is estimated, the DC offset compensation process may be initiated by the system 700, and then a DC offset estimation may be transferred to the DC offset register 640 based on an SRI protocol. Subsequently, the DC offset estimation may be applied to the analog baseband to compensate for the DC offset in the receiver architecture 300 through a subtraction.

Figure 9:
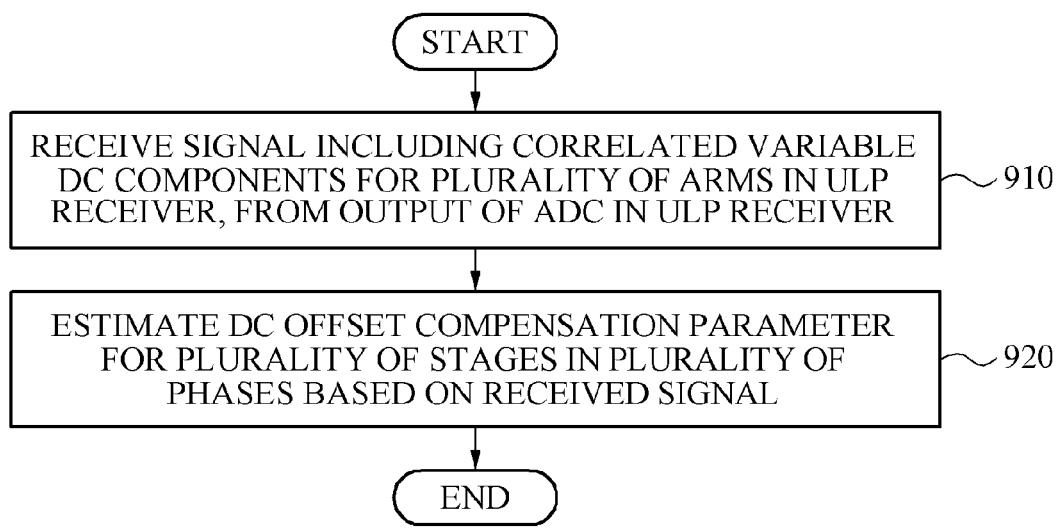
FIG. 9 illustrates an example of a method of estimating a correlated DC offset in a ULP receiver.

FIG. 9 is a flowchart illustrating an example of a method of estimating a correlated DC offset in a ULP receiver. The method of FIG. 9 may be performed by, for example, the system 200 of FIG. 2. The method of FIG. 9 may be used to compensate for a DC offset based on an estimated DC offset.

In operation 910, the method includes receiving a signal from an output of an ADC in the ULP receiver. The received signal includes correlated variable DC components for a plurality of arms in the ULP receiver. The plurality of arms includes an in-phase arm and a quadrature arm. In an example, the receiving of the signal may be performed by the receiver 241 of the system 200.

In operation 920, the method includes estimating a DC offset compensation parameter for a plurality of stages in a plurality of phases based on the received signal. In an example, the estimating of the DC offset compensation parameter may be performed by the estimator 242 of the system 200.

Figure 10:
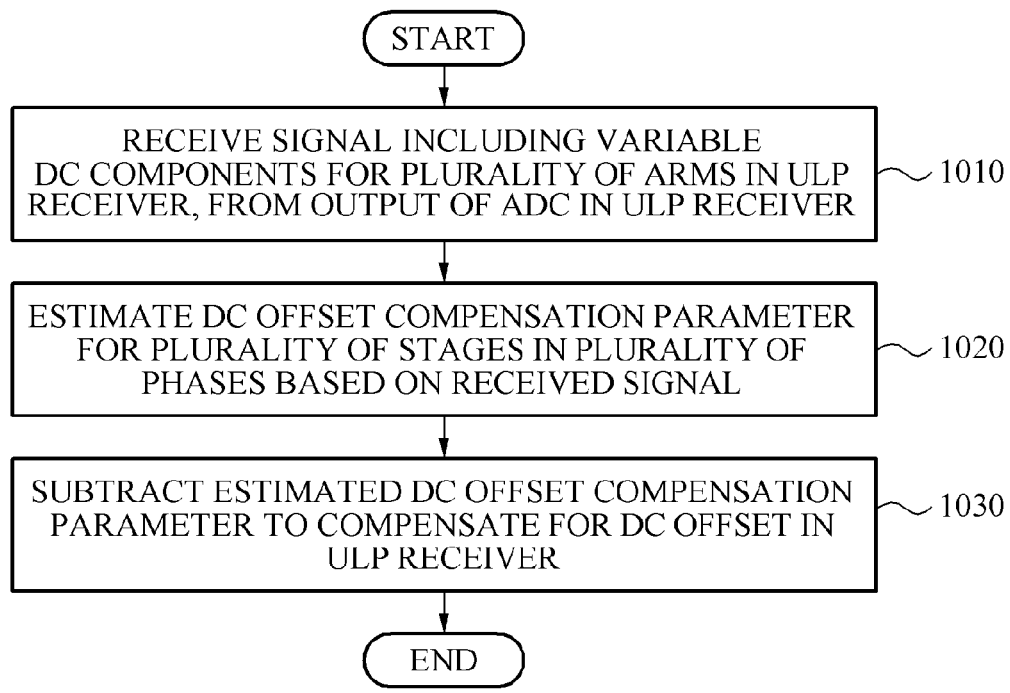
FIG. 10 illustrates an example of a method of estimating a DC offset in a ULP receiver.

FIG. 10 is a flowchart illustrating another example of a method of estimating a DC offset in a ULP receiver. The method of FIG. 10 may be performed by, for example, the system 700 of FIG. 7. The method of FIG. 10 may be used to compensate for a DC offset based on an estimated DC offset.

In operation 1010, the method includes receiving a signal from an output of an ADC in the ULP receiver. The received signal includes various DC components for a plurality of arms in the ULP receiver. The plurality of arms includes an in-phase arm and a quadrature arm. In an example, the receiving of the signal may be performed by the receiver 741 of the system 700.

In operation 1020, the method includes estimating a DC offset compensation parameter for a plurality of stages in a plurality of phases based on the received signal. In an example, the estimating of the DC offset compensation parameter may be performed by the estimator 742 of the system 700.

In operation 1030, the method includes subtracting the estimated DC offset compensation parameter to compensate for a DC offset in the ULP receiver.

Figure 8:
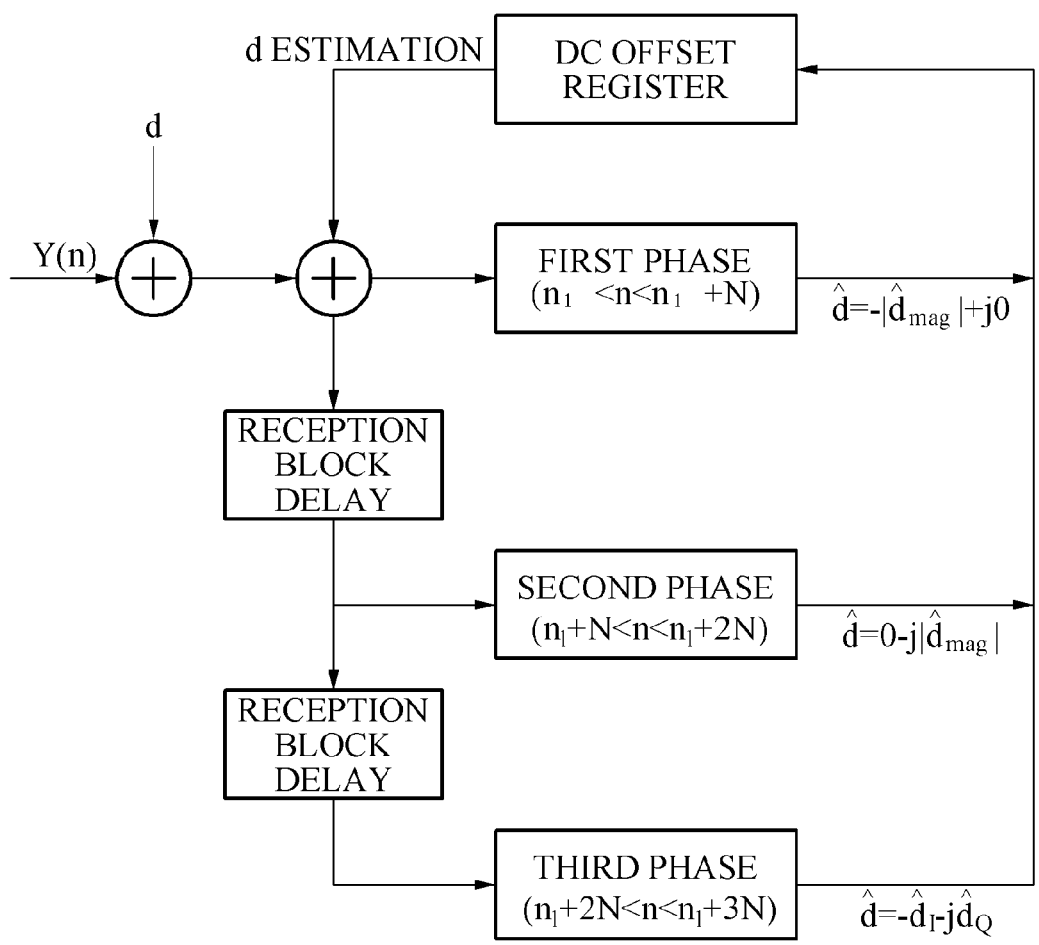
FIG. 8 illustrates an example of a process of estimating a DC offset in a plurality of phases.

FIGS. 11 through 15 are graphs illustrating examples of a result obtained by the system 200 of FIG. 2 performing the method of FIG. 8.

Figure 11:
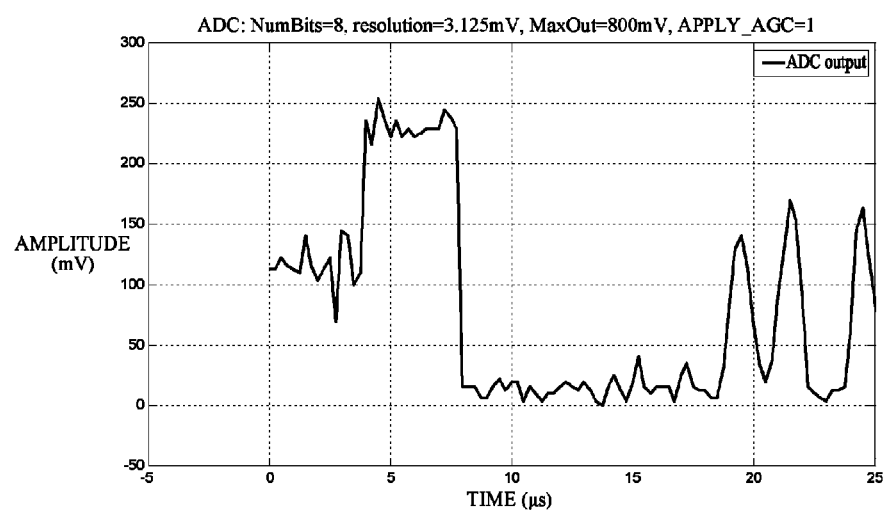
FIG. 11 illustrates an example of a graph representing a DC offset estimation and compensation process.

FIG. 11 illustrates an example of a DC offset compensation process. An ADC output from 0 to 4 µs indicates about 110 millivolts (mV) of DC offset. A sign of the DC offset may not be identified from the ADC output. When a magnitude of the DC offset is estimated, the estimated magnitude may be transferred to an analog compensation circuit to compensate for the DC offset. The analog compensation circuit may apply, through a subtraction, the magnitude of the DC offset estimated by assuming the sign of the DC offset to be a positive sign. For example, the analog compensation circuit may apply −110 mV to compensate for the DC offset from 4 to 8 µs. Thus, in consideration of the ADC output from 4 to 8 µs, a real sign of the DC offset may be identified to be a negative sign. The analog compensation circuit may apply a DC offset compensation of a correct sign by reassigning the sign of the DC offset. Through this, the DC offset may significantly decrease after 8 µs.

Figure 12:
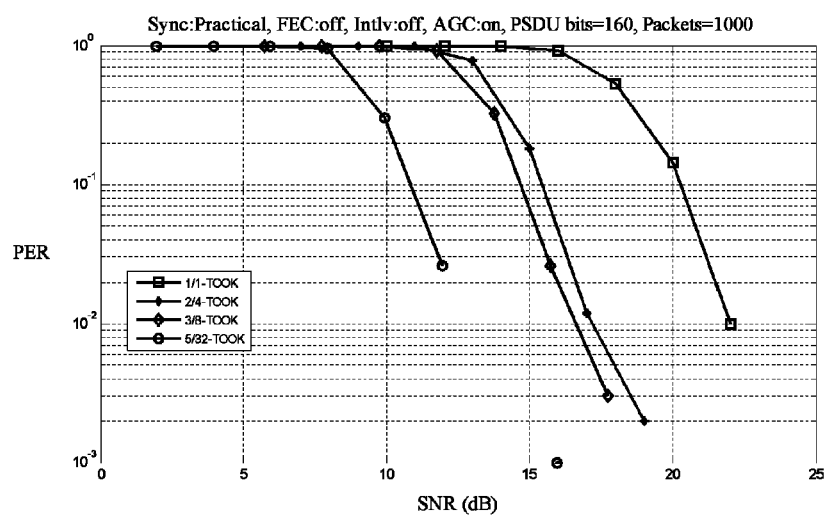
FIG. 12 illustrates an example of a Packet Error Rate (PER) provided when a DC offset compensation is absent.
Figure 13:
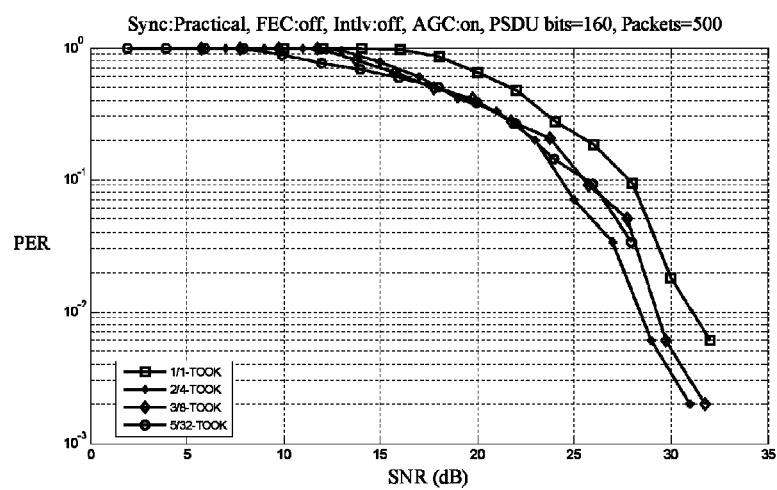
FIG. 13 illustrates an example of a PER provided when DC offset estimation and compensation is applied.

FIGS. 12 and 13 illustrate examples of a PER for a signal-to-noise ratio (SNR) in a receive antenna. FIG. 12 illustrates an example of a PER performance of a ULP receiver when a DC offset compensation is absent. FIG. 13 illustrates an example of a result in which a DC offset of a ULP receiver is removed to be at a negligible level by compensating for the DC offset based on the method of FIG. 9. A comparison of FIG. 12 to FIG. 13 reveals, a performance gain obtained by compensating for the DC offset based on the method of FIG. 9 may be between 6 and 8 dB.

Figure 14:
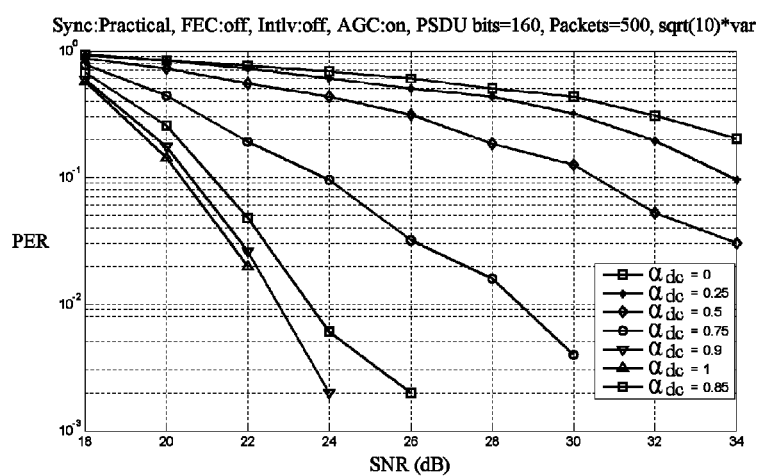
FIGS. 14 and 15 illustrate examples of an influence of a coefficient exerted on a PER when a DC offset is estimated.

FIG. 14 illustrates an example of a PER for an SNR based on an in-phase/quadrature coefficient $\alpha_{dc}$. In a case in which $\alpha_{dc}=1$, a DC offset compensation may be performed effectively and a PER performance may remain as the same when compared to a case in which the DC offset is absent. In a case in which $\alpha_{dc} \geq 0.85$, a gap of 1% PER in comparison to the case in which $\alpha_{dc}=1$ may be less than or equal to 1 dB.

Figure 15:
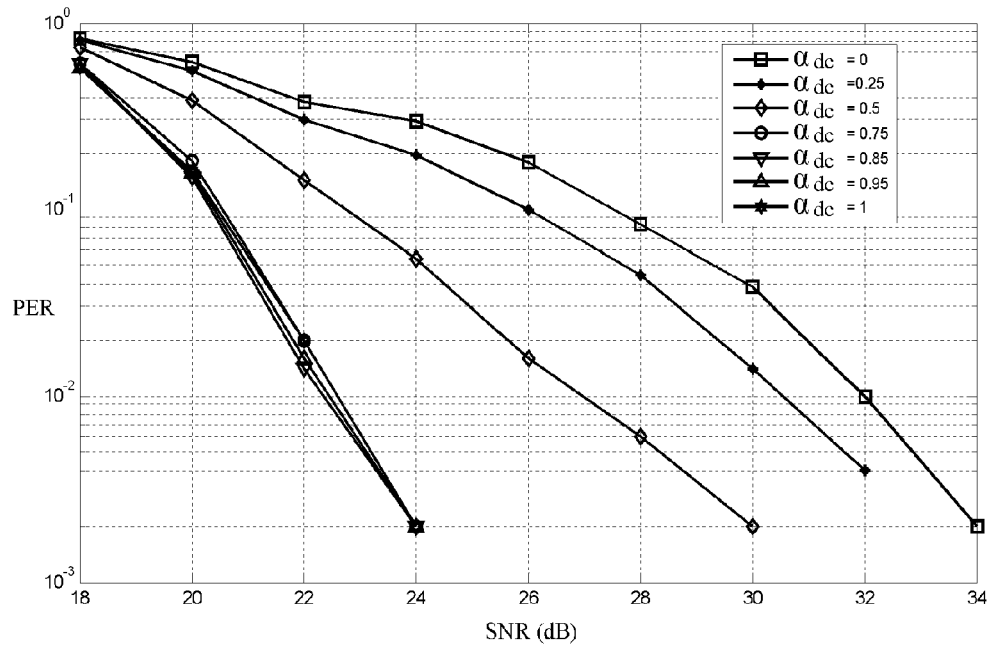

FIG. 15 illustrates another example of a PER for an SNR based on an in-phase/quadrature coefficient $\alpha_{dc}$. In a case in which $\alpha_{dc}=1$, a DC offset compensation may be performed effectively and a PER performance may remain as the same when compared to a case in which a DC offset is absent. In a case in which $\alpha_{dc} \geq 0.65$, a gap of 1% PER in comparison to the case in which $\alpha_{dc}=1$ may be less than or equal to 1 dB.

Figure 16:
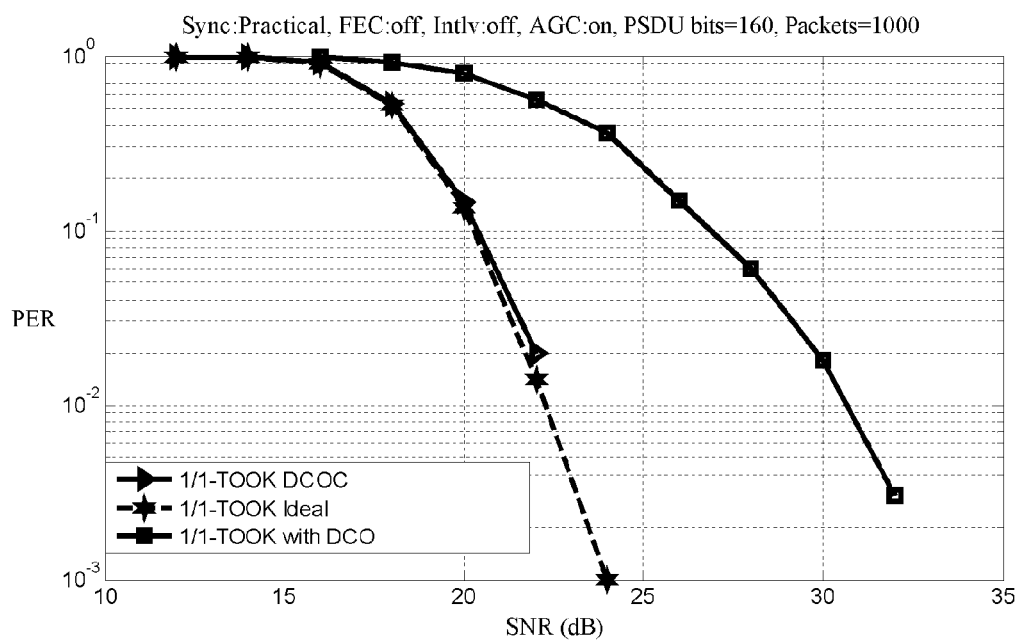
FIG. 16 illustrates another example of a PER provided when DC offset estimation and compensation is applied.
Figure 17:
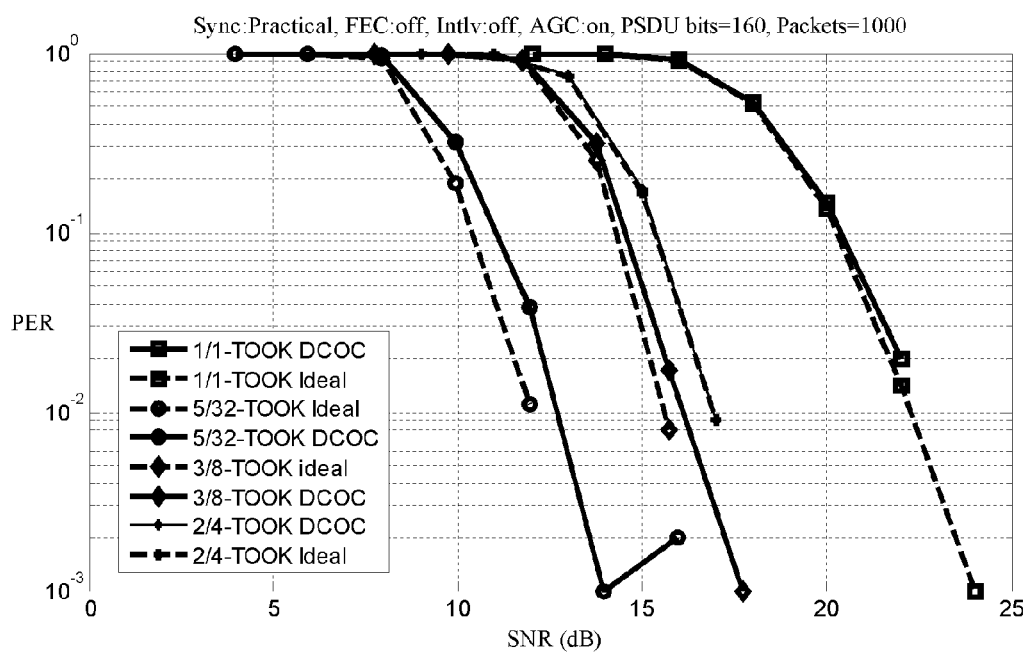
FIG. 17 illustrates an example of a PER provided when a DC offset estimation is applied according to a related art.

FIGS. 16 and 17 are graphs illustrating examples of a result obtained by the system 700 of FIG. 7 performing the method of FIG. 10.

FIGS. 16 and 17 illustrate examples of a PER for an SNR in a receive antenna. FIG. 16 illustrates an example of a result in which a DC offset in a ULP receiver is removed to be negligible by compensating for a DC offset based on the method of FIG. 10. FIG. 17 illustrates an example of a PER to which a DC offset compensation is applied according to a related art.

Figure 18:
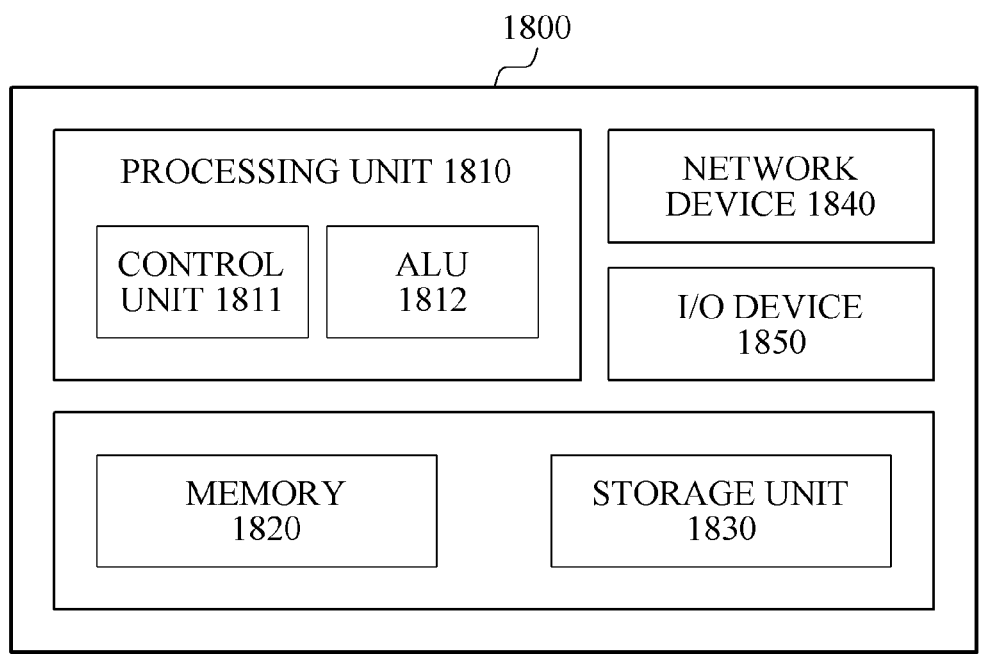
FIG. 18 illustrates an example of a computing environment implementing a method and system for estimating and compensating for a DC offset in a ULP receiver.

FIG. 18 illustrates a computing environment 1800 implementing a method and system for estimating and compensating for a DC offset in a ULP receiver. The computing environment 1800 includes at least one Processing Unit (PU), for example, a PU 1810 including a control unit 1811 and an Arithmetic and Logic Unit (ALU) 1812. The computing environment 1800 includes a memory 1820, a storage unit 1830, a plurality of network devices 1840, and an I/O device 1850. Instructions of an algorithm may be processed by the PU 1810. The PU 1810 receives a command from the control unit 1811 to perform a processing. Also, the ALU 1812 assists the processing unit 1810 to perform a logical operation and an arithmetic operation included in the command.

The computing environment 1800 may include a plurality of homogeneous and/or heterogeneous cores, a plurality of Central Processing Units (CPUs) in different types, and a media accelerator. The PU 1810 may be disposed on a single chip, and may also be disposed over a plurality of chips.

An algorithm including a command and a code used for implementation may be stored in the memory 1820 and/or the storage unit 1830. In a process of executing the algorithm, the command may be fetched from the memory 1820 and/or the storage unit 1830, and executed by the PU 1810.

For the implementation, the network devices 1840 or an external I/O device may be connected to the computing environment 1800 through the I/O device 1850.

The apparatuses, units, modules, devices, and other components illustrated in FIGS. 1-18, for example, that may perform operations described herein with respect to FIGS. 1-18, for example, are implemented by hardware components. Examples of hardware components include controllers, sensors, memory, drivers, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing instructions or software that are executed by the processing device, processor, or computer and that may control the processing device, processor, or computer to implement one or more methods described herein. Hardware components implemented by a processing device, processor, or computer execute instructions or software, such as an Operating System (OS) and one or more software applications that run on the OS, to perform the operations described herein with respect to FIGS. 1-18, for example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, Single-Instruction Single-Data (SISD) multiprocessing, Single-Instruction Multiple-Data (SIMD) multiprocessing, Multiple-Instruction Single-Data (MISD) multiprocessing, and Multiple-Instruction Multiple-Data (MIMD) multiprocessing.

The methods illustrated in FIGS. 1-18 that perform the operations described herein may be performed by a processing device, processor, or a computer as described above executing instructions or software to perform the operations described herein.

Instructions or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the instructions or software include machine code that is directly executed by the processing device, processor, or computer, such as machine code produced by a compiler. In another example, the instructions or software include higher-level code that is executed by the processing device, processor, or computer using an interpreter. Based on the disclosure herein, and after an understanding of the same, programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processing device, processor, or computer to implement the hardware components, such as discussed in any of FIGS. 1-18, and perform the methods as described above in any of FIGS. 1-18, and any associated data, data files, and data structures, are recorded, stored, or fixed in or on one or more non-transitory computer-readable storage media. Examples of a non-transitory computer-readable storage medium include Read-Only Memory (ROM), Random-Access Memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processing device, processor, or computer so that the processing device, processor, or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processing device, processor, or computer.

What is claimed is:

1. A method of estimating a correlated Direct Current (DC) offset in an Ultra-Low Power (ULP) receiver, the method comprising:
   receiving a signal from an output of an analog to Digital Converter (ADC) in the ULP receiver, the signal which includes a correlated variable DC component for at least one of an in-phase arm and a quadrature arm of the ULP receiver; and
   estimating a DC offset compensation parameter in a plurality of phases for a plurality of stages based on the received signal,
   wherein the plurality of stages comprises a noise only stage that is provided before a packet is detected and a signal and noise stage that is provided after the packet is detected, and
   wherein the estimating comprises calculating the DC offset compensation parameter in a magnitude estimation phase for the plurality of stages, and calculating the DC offset compensation parameter in a sign estimation phase for the plurality of stages.

2. The method of claim 1, wherein the received signal is an output of an envelope detector of a non-coherent receiver.

3. The method of claim 1, wherein the received signal is an envelope of an in-phase component and a quadrature component of a coherent receiver.

4. The method of claim 1, wherein the correlated variable DC component comprises a value approximate to a value of a DC offset of the in-phase arm and the quadrature arm.

5. The method of claim 1, wherein the calculating of the DC offset compensation parameter in the magnitude estimation phase comprises calculating, for the signal and noise stage, the DC offset compensation parameter in the magnitude estimation phase using zero values of the received signal in a predetermined time window.

6. The method of claim 1, wherein the calculating of the DC offset compensation parameter in the sign estimation phase comprises:

assigning, for at least one of the noise only stage and the signal and noise stage, one of a positive sign and a negative sign to the DC offset compensation parameter in the magnitude estimation phase;

obtaining the DC offset compensation parameter in the sign estimation phase in response to compensating for the DC offset performed based on a result of the assigning;

analyzing an influence of compensating for the sign estimation phase; and reassigning one of the positive sign and the negative sign to the DC offset compensation parameter based on a result of the analyzing.

7. The method of claim 6, further comprising:
compensating for the DC offset based on a result of the reassigning.

8. The method of claim 6, wherein the analyzing comprises comparing a value of the DC offset compensation parameter calculated in the magnitude estimation phase to a value of the DC offset compensation parameter calculated in the sign estimation phase.

9. The method of claim 6, wherein the reassigning comprises maintaining a sign as the result of the assigning when the DC offset compensation parameter calculated in the magnitude estimation phase is greater than the DC offset compensation parameter calculated in the sign estimation phase.

10. The method of claim 6, wherein the reassigning comprises reversing a sign from the result of the assigning when DC offset compensation parameter calculated in the magnitude estimation phase is smaller than the DC offset compensation parameter calculated in the sign estimation phase.

11. A method of estimating a Direct Current (DC) offset in an Ultra-Low Power (ULP) receiver, the method comprising:

receiving a signal from an output of an Analog to Digital Converter (ADC) in the ULP receiver, the signal including a variable DC component for at least one of an in-phase arm and a quadrature arm of the ULP receiver; and estimating a DC offset compensation parameter in a plurality of phases for a plurality of stages based on the received signal, wherein the plurality of stages comprises a noise only stage that is provided before a packet is detected and a signal and noise stage that is provided after the packet is detected, and wherein the estimating comprises calculating a magnitude of a DC offset in a first phase based on the received signal, calculating a magnitude of the DC offset in a second phase based on the received signal and calculating a DC offset compensation parameter in the in-phase arm based on the magnitudes calculated in the first phase and the second phase, and calculating a magnitude of the DC offset in a third phase based on the received signal and calculating the DC offset compensation parameter in the quadrature arm based on the magnitudes calculated in the first phase and the third phase.

12. The method of claim 11, wherein the DC offset compensation parameter in the in-phase arm comprises the magnitude and a sign of the DC offset in the in-phase arm, and the DC offset compensation parameter in the quadrature arm comprises the magnitude and a sign of the DC offset in the quadrature arm.

13. The method of claim 11, further comprising:
compensating for the DC offset based on the estimated DC offset compensation parameter.

14. A system for estimating a correlated Direct Current (DC) offset in an Ultra-Low Power (ULP) receiver, the system comprising:

a processor; and a memory configured to connect to the processor and comprising a plurality of modules operates through the processor, wherein the plurality of modules comprises a receiver configured to receive a signal from an output of an Analog to Digital Converter (ADC) in the ULP receiver, the signal including a correlated variable DC component for at least one of an in-phase arm and a quadrature arm in the ULP receiver; and an estimator configured to estimate a DC offset compensation parameter for a plurality of stages in a plurality of phases based on the received signal, wherein the plurality of stages comprises a noise only stage that is provided before a packet is detected and a signal and noise stage that is provided after the packet is detected, and wherein the estimator is configured to calculate the DC offset compensation parameter in a magnitude estimation phase for the plurality of stages and calculate the DC offset compensation parameter in a sign estimation phase for the plurality of phases.

15. The system of claim 14, wherein the estimator is configured to estimate the DC offset parameter the noise only stage and the signal and noise stage when the DC offset parameter is estimated for the plurality of stages in the plurality of phases by:

assigning one of a positive sign and a negative sign to the DC offset compensation parameter in the magnitude estimation phase;

obtaining the DC offset compensation parameter in the sign estimation phase by compensating for the DC offset based on a result of the assigning;

analyzing an influence of compensating for the sign estimation phase; and re-assigning a sign to the DC offset compensation parameter based on a result of the analyzing.

16. The system of claim 15, wherein the estimator is configured to, in a process of the analyzing, compare a value of the DC offset compensation parameter calculated in the magnitude estimation phase to a value of the DC offset compensation parameter calculated in the sign estimation phase.

17. The system of claim 15, wherein the estimator is configured to, in a process of the re-assigning, maintain the result of the assigning in response to the DC offset compensation parameter calculated in the magnitude estimation phase being greater than the DC offset compensation parameter calculated in the sign estimation phase.

18. The system of claim 15, wherein the estimator is configured to, in a process of the re-assigning, reverse the result of the assigning in response to the DC offset compensation parameter calculated in the magnitude estimation phase being smaller than the DC offset compensation parameter calculated in the sign estimation phase.

* * * * *